(12) United States Patent
Hancock, Sr.

(10) Patent No.: US 11,955,114 B1
(45) Date of Patent: Apr. 9, 2024

(54) METHOD AND SYSTEM FOR PROVIDING REAL-TIME TRUSTWORTHINESS ANALYSIS

(71) Applicant: Craig Hancock, Sr., Philadelphia, PA (US)

(72) Inventor: Craig Hancock, Sr., Philadelphia, PA (US)

( * ) Notice: Subject to any disclaimer, the term of this patent is extended or adjusted under 35 U.S.C. 154(b) by 0 days.

(21) Appl. No.: 18/352,893

(22) Filed: Jul. 14, 2023

(51) Int. Cl.
  *G10L 15/14* (2006.01)
  *G10L 25/78* (2013.01)
  *G10L 25/90* (2013.01)

(52) U.S. Cl.
  CPC .............. *G10L 15/14* (2013.01); *G10L 25/78* (2013.01); *G10L 25/90* (2013.01)

(58) Field of Classification Search
  CPC .......... G10L 15/14; G10L 25/78; G10L 25/90
  USPC ........................................................ 704/231
  See application file for complete search history.

(56) References Cited

U.S. PATENT DOCUMENTS

| | | | | |
|---|---|---|---|---|
| 2011/0161076 A1* | 6/2011 | Davis | ............... | H04M 1/72448 704/E15.001 |
| 2015/0127660 A1* | 5/2015 | Zilberberg | ............ | G06F 16/254 707/748 |
| 2022/0086393 A1* | 3/2022 | Peters | ..................... | G06V 20/41 |
| 2023/0048098 A1* | 2/2023 | Lam | ......................... | G10L 25/63 |

FOREIGN PATENT DOCUMENTS

CN 116830191 A * 9/2023 ............. G10L 15/16

OTHER PUBLICATIONS

M.S. S. Syed, M. Stolar, E. Pirogova and M. Lech, "Speech Acoustic Features Characterising Individuals with High and Low Public Trust," 2019 13th International Conference on Signal Processing and Communication Systems (ICSPCS), Gold Coast, QLD, Australia, 2019, pp. 1-9, doi: 10.1109/ICSPCS47537.2019. (Year: 2019).*
T. Polzehl, S. Möller and F. Metze, "Automatically assessing acoustic manifestations of personality in speech," 2010 IEEE Spoken Language Technology Workshop, Berkeley, CA, USA, 2010, pp. 7-12, doi: 10.1109/SLT.2010.5700814. (Year: 2010).*

* cited by examiner

*Primary Examiner* — Bharatkumar S Shah

(57) ABSTRACT

Disclosed herein is a method for providing real-time trustworthiness analysis. The method comprises the steps of: receiving, by a speech data receiving module, speech data; delivering, by the speech data receiving module, the speech data to a speech analysis module; analyzing, by the speech analysis module, the speech data to identify one or more speech attributes; quantifying, by the speech analysis module, at least one of the speech attributes with an attribute score; and determining, by a trustworthiness determination module, a trustworthiness level based on the attribute score of the at least one of the speech attributes.

10 Claims, 6 Drawing Sheets

METHOD AND SYSTEM FOR PROVIDING REAL-TIME TRUSTWORTHINESS ANALYSIS

TECHNICAL FIELD

Generally, the present disclosure relates to the field of data processing. More specifically, the present disclosure relates to methods and systems for providing real-time trustworthiness analysis.

BACKGROUND

Millions of people utilize mobile and non-mobile electronic devices, such as smartphones, tablets, laptop computers and desktop computers, in order to engage in a video conference or a chat session. It is realized even a legitimate party, who is not necessarily a fraud, may sometimes lie, or be untruthful or dishonest when he or she participates in a conference or chat session. For example, the party may provide incorrect information, inaccurate information, exaggerated information, "beautified" information, or the like. The information in the conference or chat conversation may be overwhelming, and it is usually unrealistic to discern if the party is telling the truth or a lie.

Therefore, there is a need for improved methods and systems for providing real-time trustworthiness analysis that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for providing real-time trustworthiness analysis. The method may comprise the steps of: receiving, by a speech data receiving module, speech data; delivering, by the speech data receiving module, the speech data to a speech analysis module; analyzing, by the speech analysis module, the speech data to identify one or more speech attributes; quantifying, by the speech analysis module, at least one of the speech attributes with an attribute score; and determining, by a trustworthiness determination module, a trustworthiness level based on the attribute score of the at least one of the speech attributes.

According to some embodiments, a system for providing real-time trustworthiness analysis is disclosed. The system may comprise a processor and a memory. Modules are stored on the memory for execution by the processor. The modules may comprise a speech data receiving module; a speech analysis module; and a trustworthiness determination module. The speech data receiving module may be configured for receiving speech data and delivering the speech data to a speech analysis module. The speech analysis module may be configured for analyzing the speech data to identify one or more speech attributes and quantifying at least one of the speech attributes with an attribute score. The trustworthiness determination module may be configured for determining a trustworthiness level based on the attribute score of the at least one of the speech attributes.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
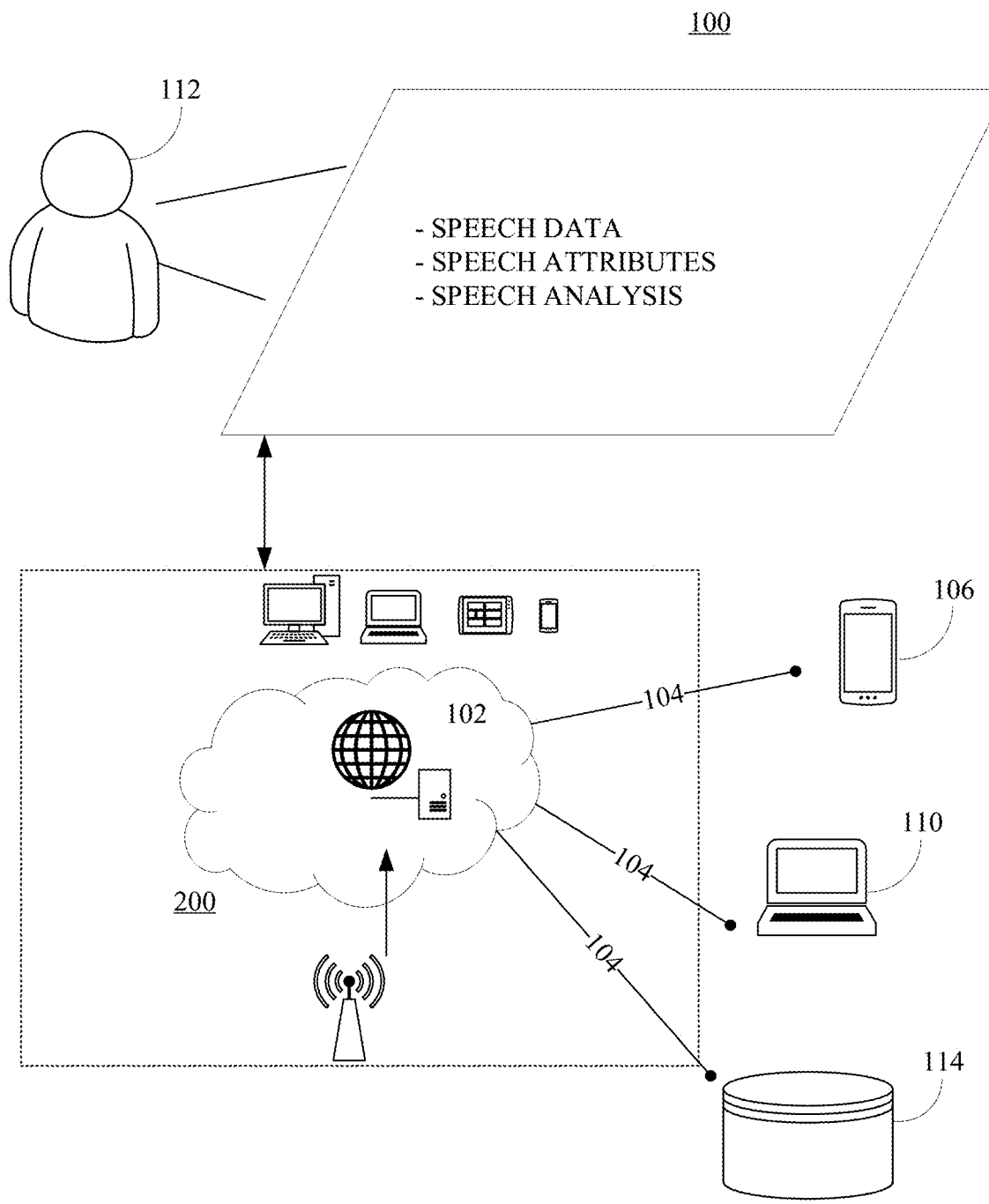
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of systems and methods for providing real-time trustworthiness analysis, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a smart television, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, a GLONASS-K2 receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods and systems for providing real-time trustworthiness analysis. The present invention is preferably implemented as a software application that is executed on a computing device such as a personal computing device, a mobile device, or a server, among others.

Referring now to figures, FIG. 1 is an illustration of an online platform 100 consistent with various embodiments of the present disclosure. By way of non-limiting example, the online platform 100 to provide real-time trustworthiness analysis may be hosted on a centralized server 102, such as, for example, a cloud computing service. The centralized server 102 may communicate with other network entities, such as, for example, a mobile device 106 (such as a smartphone, a laptop, a tablet computer, a smart television, etc.), other electronic devices 110 (such as desktop computers, server computers, etc.), and databases 114 over a communication network 104, such as, but not limited to, the Internet. Further, users of the online platform 100 may include relevant parties. Accordingly, in some instances, electronic devices operated by the one or more relevant parties may be in communication with the platform 100.

A user 112, such as the one or more relevant parties, may access online platform 100 through a web-based software application or browser. The web-based software application may be embodied as, for example, but not be limited to, a website, a web application, a desktop application, and a mobile application compatible with a computing device 600.

Figure 2:
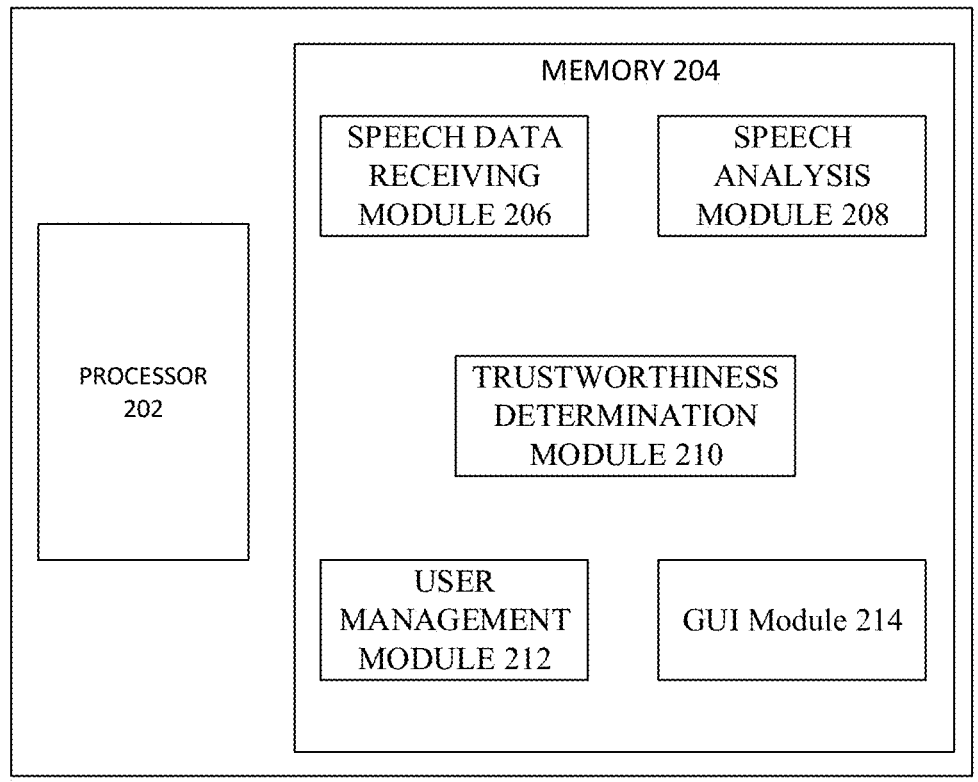
FIG. 2 is a block diagram of a system for providing real-time trustworthiness analysis, in accordance with some embodiments.

FIG. 2 is a block diagram of a system for providing real-time trustworthiness analysis, in accordance with some embodiments. Accordingly, the system may include a processor 202 and a memory 204. The memory 204 may be used to store software programs and modules of application software. In one embodiment. The processor 202 runs the software programs and modules stored in memory 204 to perform various functional applications and data processing, that is, to implement the method for providing real-time trustworthiness analysis. Memory 204 may include a high-speed random-access memory (RAM) and may also include non-volatile memory such as one or a plurality of magnetic storage apparatuses, a flash memory, or other non-volatile solid-state memories. In some examples, memory 204 may further include memories remotely provided with respect to the processor 202, and these remote memories may be connected to the processor 202 via a network. Examples of the aforementioned network include, but are not limited to, the Internet, intranets, local area networks, mobile communication networks, and the combinations thereof.

In one embodiment, the modules stored in the memory 204 comprise a speech data receiving module 206, a speech analysis module 208, and a trustworthiness determination module 210. The communication data receiving module 206 is configured to receive speech data. In one embodiment, the speech data is received from a phone call over a communication network. The communication network may be packet-switched and/or circuit-switched. An illustrative communication network includes, without limitation, a Wide Area Network (WAN), such as the Internet, a Local Area Network (LAN), a Personal Area Network (PAN), a Public Switched Telephone Network (PSTN), a Plain Old Telephone Service (POTS) network, a cellular communications network, an IP Multimedia Subsystem (IMS) network, a Voice over IP (VoIP) network, a SIP network, or combinations thereof. In another embodiment, the speech data is received from an audio track of a live stream of video content. The speech data receiving module is further configured to deliver the speech data to speech analysis module 208.

The speech analysis module 208 is configured to analyze the speech data to identify one or more speech attributes. In one embodiment, the speech attributes may include speech hesitations, speech errors, high-pitched voices, speech rate, latency period, and pauses. Hesitations are cadence inconsistencies and usually occur when the user inserts fillers such as "uhm", "uh", "hmm", and related non-lexical utterances while speaking. When a party is telling the truth, it is more likely that he/she does not need to hesitate.

Moreover, speech errors, which are deviations from the apparently intended form of an utterance, will usually occur if the party is making a false statement. Common types of speech errors include but are not limited to substitutions of words in the utterance, additions of unintended words, deletions of intended words, and shifts in the order of intended words.

In addition, people's voices also tend to rise in pitch when they are lying compared to when they are telling the truth. In addition, a slower speech rate is generally perceived as dishonest. Speech latency is the delay between the question being asked and the other person replying. Liars need to think about what they are going to say as opposed to a truth-teller who simply remembers or responds without caution. Therefore, the latency period may thus be an indicator of deception. Moreover, although it's normal for people to take pauses when they talk to catch their breath and keep their train of thought, people who are lying may pause for longer and respond more slowly than someone that is telling the truth. Preferably, the speech analysis module 208 analyzes all the abovementioned speech attributes. However, certain embodiments may focus on specific attributes or even just a single attribute.

The speech analysis module 208 is configured to quantify at least one of the speech attributes with an attribute score. For example, the attribute score for speech hesitations may be generated based on the frequency or number of appearances of the non-lexical utterances in the speech data. In one embodiment, the attribute score for speech errors may be generated based on the frequency or number of appearances of the speech errors. In one embodiment, the attribute score for high-pitched voices may be generated based on vocal pitch and frequency or number of appearances of high-pitched voices. In one embodiment, the attribute score for speech rate may be generated based on a comparison of a rate of speech with a predetermined rate. The predetermined rate may be a median value of speech rate for users with a similar age, gender and education. In one embodiment, the attribute score for latency period may be generated based on total time of latency. In one embodiment, the attribute score for pauses may be generated based on frequency or number of appearances of the pauses. In the illustrated embodiment, the attribute scores are percentages from 0 to 100. A higher percentage indicates a greater likelihood of the party being untrustworthy. In a preferred embodiment, the speech analysis module 208 utilizes an artificial intelligence or machine learning algorithm to perform the analysis.

The trustworthiness determination module 210 is configured to determine a trustworthiness level based on the attribute score of the at least one of the speech attributes. Different methods could be used to determine the trustworthiness level. For example, the trustworthiness level may be determined based on an aggregation of the attribute scores for the speech attributes. If the determined trustworthiness level exceeds a predetermined threshold, the party may be identified as "untrustworthy", and an alert may be generated by the trustworthiness determination module 210. In one embodiment, the alert may be in the form of an audible, visual, and/or sensory (vibration) alert. In one embodiment, a buzzer or beep sound may be generated to alert the user while the user is on a phone call. If the determined trustworthiness level falls below the predetermined threshold, the party may be identified as "trustworthy".

Additionally or optionally, the modules stored in the memory 204 further comprises a user management module 212 and a Graphical User Interface ("GUI") module 214. The user management module 212 is used to register users in the system and perform authentication of the users. The users need to provide their registration information to create an account in the system. The user management module receives each user's registration information and creates accounts accordingly. For example, the user's registration information can include but not limited to username, phone number, password, etc. In one embodiment, the user management module generates login credentials for the user based on the user's registration information and stores the login credentials in a database. In this way, each user is able to access the system of the present application using the login credentials from their smartphones, laptops, desktops, etc. It should be understood that the present invention may also employ other authentication schemes, including but not limited to graphical password, pattern lock, and biometrics.

Figure 5:
FIG. 5 is a screenshot of a user interface illustrating the software application of the present invention, in accordance with some embodiments.
Figure 6:
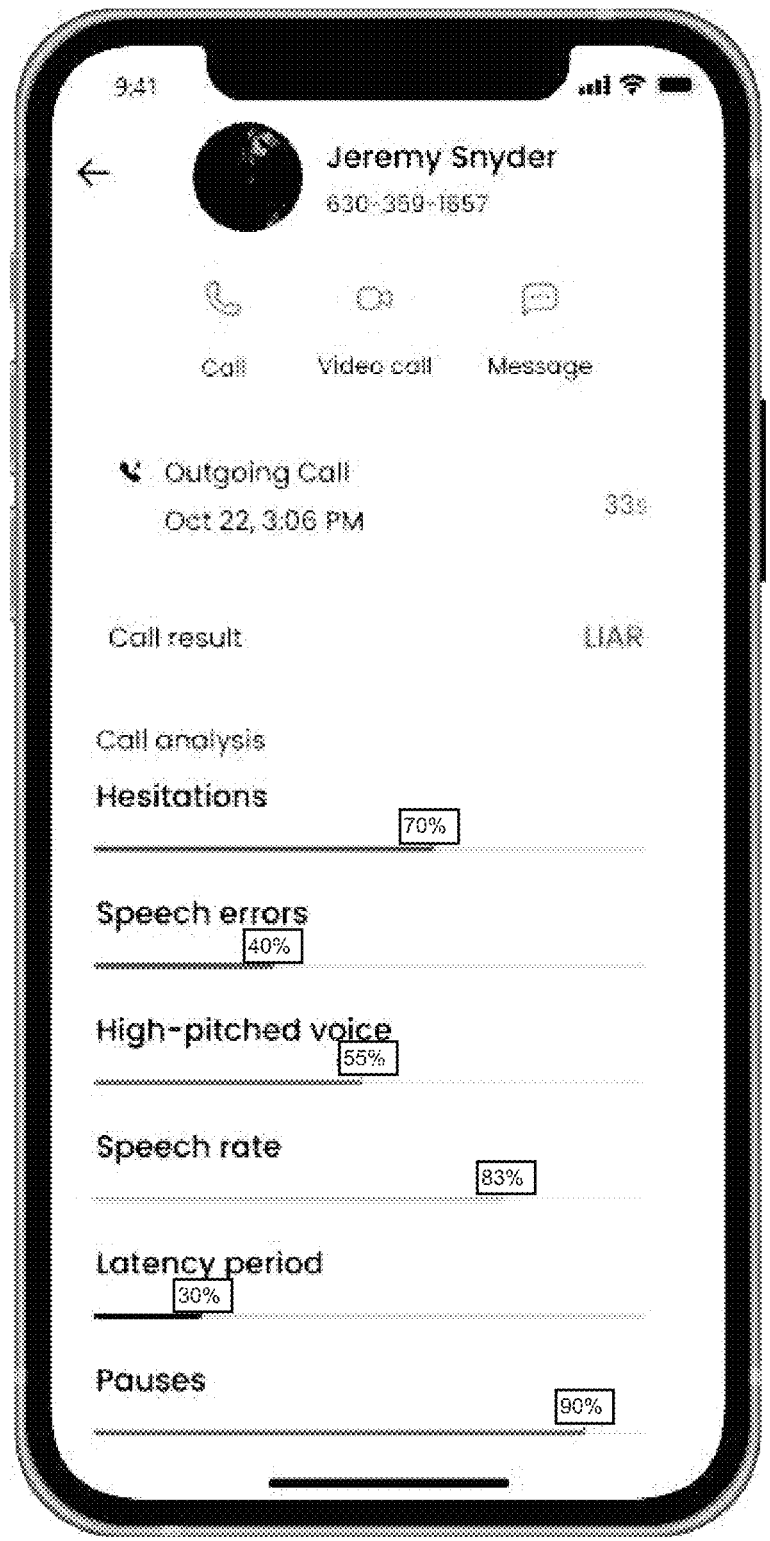
FIG. 6 is another screenshot of a user interface illustrating the software application of the present invention, in accordance with some embodiments.

The GUI module 214 generates graphical data for displaying a user interface which enables the users to interact with the present invention. A user can input information into the user interface and the GUI module 214 relays the information to other modules for further processing. For example, the user interface may include a login box into which the users can enter login credentials, and then the credentials are transmitted from the GUI module 214 to the user management module 212 for user authentication. If the login credentials do not match with those in the database, the GUI module will generate a pop-up window requiring the user to re-enter the credentials. As another example, if the trustworthiness determination module 210 determines that the party is untrustworthy and generates the alert, the GUI module 214 may generate a visual representation of the alert and the quantified speech attributes, as shown in FIGS. 5-6.

Figure 3:
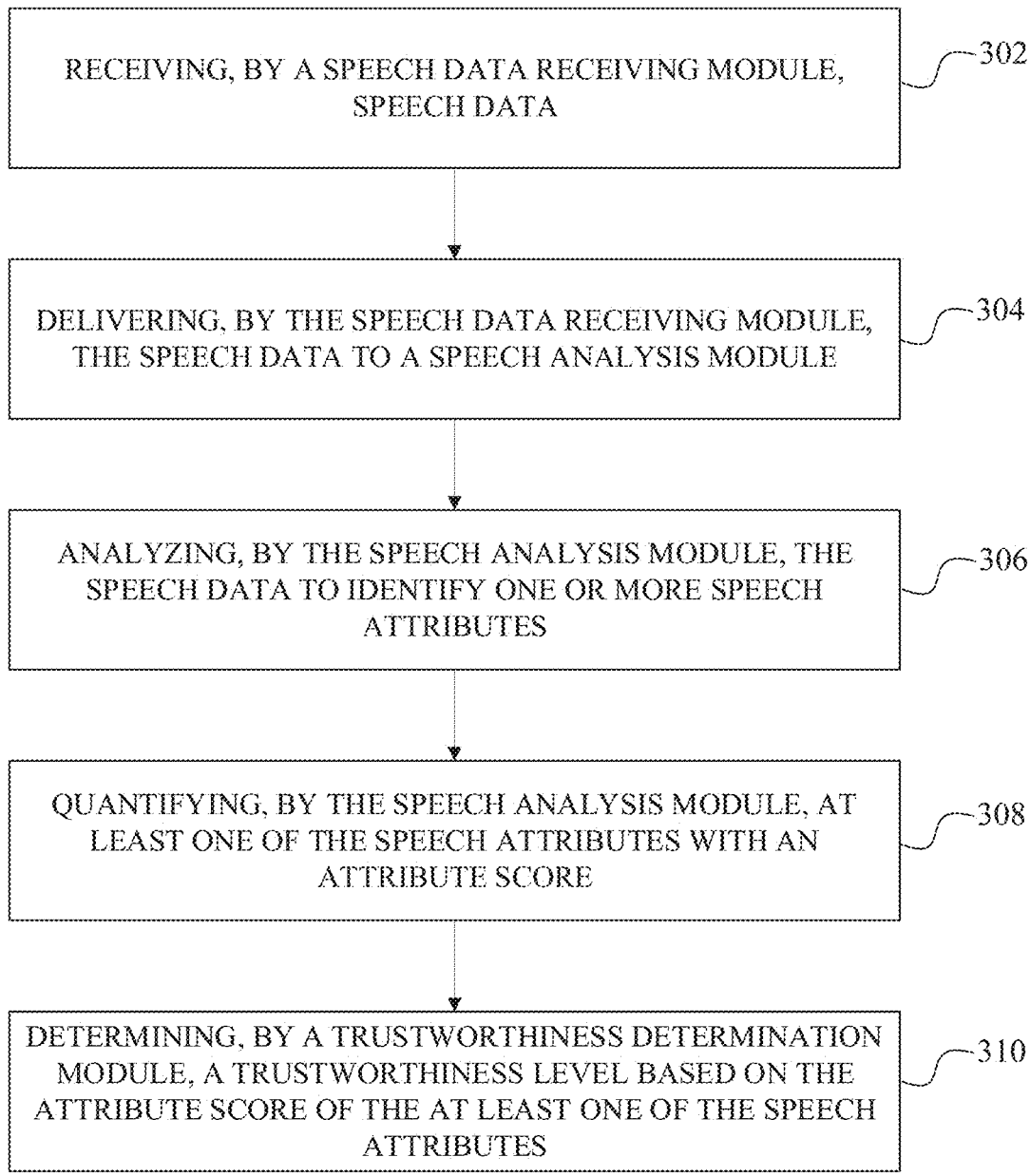
FIG. 3 is a flowchart of a method for providing real-time trustworthiness analysis, in accordance with some embodiments.

FIG. 3 is a flowchart of a method 300 for providing real-time trustworthiness analysis. The method 300 comprises the following steps: receiving at step 302, by a speech data receiving module, speech data; delivering at step 304, by the speech data receiving module, the speech data to a speech analysis module; analyzing at step 306, by the speech analysis module, the speech data to identify one or more speech attributes; quantifying at step 308, by the speech analysis module, at least one of the speech attributes with an attribute score; and determining at step 310, by a trustworthiness determination module, a trustworthiness level based on the attribute score of the at least one of the speech attributes.

In one embodiment, the speech data is received from a phone call. In another embodiment, the speech data is received from an audio track of a live stream of video content.

In one embodiment, the speech attributes comprise speech hesitations, speech errors, high-pitched voices, speech rate, latency period, and pauses. In step 308, quantifying at least one of the speech attributes comprises quantifying each of the speech attributes with the attribute score. In step 310, determining the trustworthiness level comprises determining the trustworthiness level based on the attribute scores of all speech attributes.

In a preferred embodiment, the attribute score for speech hesitations is generated based on frequency or number of appearances of the non-lexical utterances in the speech data; the attribute score for speech errors is generated based on frequency or number of appearances of the speech errors; the attribute score for high-pitched voices is generated based on vocal pitch and frequency or number of appearances of high-pitched voices; the attribute score for speech rate is generated based on a comparison of a rate of speech with a predetermined rate; the attribute score for latency period is generated based on total time of latency; and the attribute score for pauses is generated based on frequency or number of appearances of the pauses.

Figure 4:
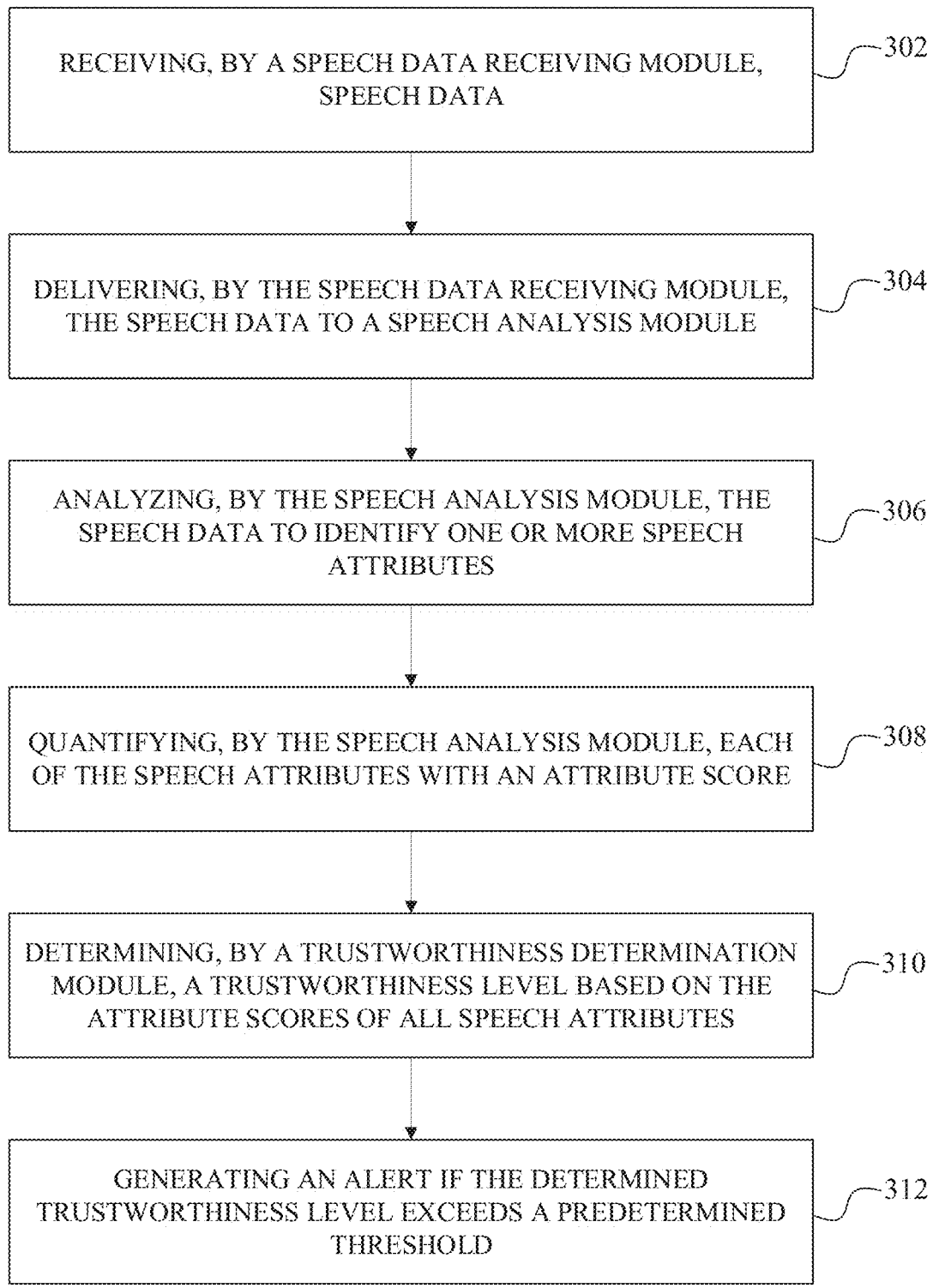
FIG. 4 is a flowchart of an alternative method for providing real-time trustworthiness analysis, in accordance with some embodiments.

In one embodiment, the trustworthiness level is determined based on an aggregation of the attribute scores for the speech attributes. The method may further comprise generating at step 312 an alert if the determined trustworthiness level exceeds a predetermined threshold, as shown in FIG. 4.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The following is claimed:

1. A method for providing real-time trustworthiness analysis, comprising:
   receiving, by a speech data receiving module, speech data;
   delivering, by the speech data receiving module, the speech data to a speech analysis module;
   analyzing, by the speech analysis module, the speech data to identify one or more speech attributes, wherein the speech attributes comprise speech hesitations, speech errors, high-pitched voices, speech rate, latency period, and pauses;
   quantifying, by the speech analysis module, at least one of the speech attributes with an attribute score; and
   determining, by a trustworthiness determination module, a trustworthiness level based on the attribute score of the at least one of the speech attributes;
   wherein quantifying at least one of the speech attributes comprises quantifying each of the speech attributes with the attribute score, and determining the trustworthiness level comprises determining the trustworthiness level based on the attribute scores of all speech attributes; and
   wherein:
   the attribute score for speech hesitations is generated based on frequency or number of appearances of the non-lexical utterances in the speech data;
   the attribute score for speech errors is generated based on frequency or number of appearances of the speech errors;
   the attribute score for high-pitched voices is generated based on vocal pitch and frequency or number of appearances of high-pitched voices;
   the attribute score for speech rate is generated based on a comparison of a rate of speech with a predetermined rate;
   the attribute score for latency period is generated based on total time of latency; and
   the attribute score for pauses is generated based on frequency or number of appearances of the pauses.

2. The method as claimed in claim 1, wherein the speech data is received from a phone call.

3. The method as claimed in claim 1, wherein the speech data is received from an audio track of a live stream of video content.

4. The method as claimed in claim 1, wherein the trustworthiness level is determined based on an aggregation of the attribute scores for the speech attributes.

5. The method as claimed in claim 4, further comprising:
   generating an alert if the determined trustworthiness level exceeds a predetermined threshold.

6. A system for providing real-time trustworthiness analysis, comprising:
   a processor;
   a memory, wherein modules are stored on the memory for execution by the processor, the modules comprising:
   a speech data receiving module;
   a speech analysis module;
   a trustworthiness determination module;
   the speech data receiving module being configured for receiving speech data and delivering the speech data to a speech analysis module;
   the speech analysis module being configured for analyzing the speech data to identify one or more speech attributes and quantifying at least one of the speech attributes with an attribute score, wherein the speech attributes comprise speech hesitations, speech errors, high-pitched voices, speech rate, latency period, and pauses, and wherein the speech analysis module is configured for quantifying each of the speech attributes with the attribute score, and the trustworthiness determination module is configured for determining the trustworthiness level based on the attribute scores of all speech attributes; and
   the trustworthiness determination module being configured for determining a trustworthiness level based on the attribute score of the at least one of the speech attributes;
   wherein:
   the attribute score for speech hesitations is generated based on frequency or number of appearances of the non-lexical utterances in the speech data;
   the attribute score for speech errors is generated based on frequency or number of appearances of the speech errors;
   the attribute score for high-pitched voices is generated based on vocal pitch and frequency or number of appearances of high-pitched voices;
   the attribute score for speech rate is generated based on a comparison of a rate of speech with a predetermined rate;
   the attribute score for latency period is generated based on total time of latency; and
   the attribute score for pauses is generated based on frequency or number of appearances of the pauses.

7. The system as claimed in claim 6, wherein the speech data is received from a phone call.

8. The system as claimed in claim 6, wherein the speech data is received from an audio track of a live stream of video content.

9. The system as claimed in claim 6, wherein the trustworthiness determination module is configured for determining the trustworthiness level based on an aggregation of the attribute scores for the speech attributes.

10. The system as claimed in claim 9, wherein the trustworthiness determination module is further configured for generating an alert if the determined trustworthiness level exceeds a predetermined threshold.

\* \* \* \* \*